(12) United States Patent
Sella et al.

(10) Patent No.: US 8,505,701 B2
(45) Date of Patent: Aug. 13, 2013

(54) MASS-DAMPER SYSTEM

(75) Inventors: Terry Sella, Reese, MI (US); Charles Bonam, Chesterfield, MI (US); Russell Gans, Farmington Hills, MI (US); Dean Cole, Macomb, MI (US)

(73) Assignee: Autoliv ASP, Inc., Ogden, UT (US)

( * ) Notice: Subject to any disclaimer, the term of this patent is extended or adjusted under 35 U.S.C. 154(b) by 207 days.

(21) Appl. No.: 12/858,945

(22) Filed: Aug. 18, 2010

(65) Prior Publication Data

US 2012/0043171 A1 Feb. 23, 2012

(51) Int. Cl.
*F16F 7/10* (2006.01)
*B60R 21/16* (2006.01)

(52) U.S. Cl.
USPC ...................................... 188/379; 280/728.2

(58) Field of Classification Search
USPC .............. 267/135, 140.11, 140.3, 141.4, 141; 280/728.2, 731; 411/512, 907, 95, 104, 112; 188/378–380; 248/634; 361/679.33, 679.34, 361/679.35, 679.36, 679.37; 403/251, 379.6, 403/408.1; 439/76.1; 446/116, 121; 74/574.4, 74/574.2, 574.3
See application file for complete search history.

(56) References Cited

U.S. PATENT DOCUMENTS

| | | | |
|---|---|---|---|
| 2,367,657 A | | 1/1945 | Boersma |
| 2,951,674 A | | 9/1960 | Rice |
| 4,104,952 A | * | 8/1978 | Brass ............................. 411/500 |
| 5,024,464 A | * | 6/1991 | Kawaguchi et al. .......... 280/731 |
| 5,303,952 A | * | 4/1994 | Shermetaro et al. .......... 280/731 |
| 5,316,423 A | * | 5/1994 | Kin ................................ 411/510 |
| 5,383,682 A | * | 1/1995 | Nagata et al. ................. 280/777 |
| 6,196,573 B1 | * | 3/2001 | Worrell et al. .............. 280/728.2 |
| 6,764,104 B2 | * | 7/2004 | Berg ........................... 285/148.3 |
| 6,817,456 B2 | * | 11/2004 | Kato et al. ..................... 188/380 |
| 6,908,102 B2 | * | 6/2005 | Sugimoto ................... 280/728.2 |
| 7,213,486 B2 | * | 5/2007 | Lorenz ............................ 74/552 |
| 7,246,797 B2 | | 7/2007 | Gustavsson |
| 7,369,402 B2 | * | 5/2008 | Huang ..................... 361/679.33 |

(Continued)

FOREIGN PATENT DOCUMENTS

| | | |
|---|---|---|
| CA | 460072 | 10/1949 |
| GB | 635589 | 7/1947 |

OTHER PUBLICATIONS

International Search Report and Written Opinion of the International Searching Authority for International Application No. PCT/US 11/48104, dated Jan. 23, 2012.

*Primary Examiner* — Robert A Siconolfi
*Assistant Examiner* — Stephen Bowes
(74) *Attorney, Agent, or Firm* — Harness, Dickey & Pierce, P.L.C.

(57) ABSTRACT

A vibration attenuation apparatus may include a mass element, a bracket, and an elastomeric member. The mass element may include a first aperture. The bracket may include first and second portions. The first portion may be attached to a structure that transmits an input vibration. The elastomeric member may engage the mass element and the second portion of the bracket and may suspend the mass element relative to the bracket. The elastomeric member may include a shaft portion and a barb portion. The shaft portion may engage the second portion of the bracket. The barb portion may engage the first aperture of the mass element. The elastomeric member may include properties allowing the mass element to move relative to the bracket in response to the input vibration at a frequency that reduces an amplitude of the input vibration.

15 Claims, 5 Drawing Sheets

(56) References Cited

U.S. PATENT DOCUMENTS

| | | | |
|---|---|---|---|
| 7,480,136 B2* | 1/2009 | Lalouette | 361/679.34 |
| 2003/0145446 A1* | 8/2003 | Lodholz et al. | 29/418 |
| 2004/0026908 A1* | 2/2004 | Schneider et al. | 280/731 |
| 2004/0254020 A1* | 12/2004 | Dragusin | 463/46 |
| 2008/0136073 A1* | 6/2008 | Kreuzer | 267/140.11 |
| 2009/0218739 A1* | 9/2009 | Terada et al. | 267/2 |

* cited by examiner

MASS-DAMPER SYSTEM

FIELD

The present disclosure relates to a vibration attenuation system for a vehicle steering wheel, and more particularly to a mass-damper system having an elastomeric element.

BACKGROUND

This section provides background information related to the present disclosure which is not necessarily prior art.

Comfort and feel are important qualities in modern automotive vehicles. Noise, vibration and harshness (NVH) in a steering wheel of the vehicle can adversely affect the overall comfort and feel of the vehicle. Vibrations from the engine, suspension and/or other components of the vehicle may propagate through the steering system to the steering wheel and the driver's hands. Such vibrations can be uncomfortable and/or produce undesirable noise.

SUMMARY

This section provides a general summary of the disclosure, and is not a comprehensive disclosure of its full scope or all of its features.

In one form, the present disclosure provides a vibration attenuation apparatus that may include a mass element, a bracket, and an elastomeric member. The mass element may include a first aperture. The bracket may include first and second portions. The first portion may be adapted to be attached to a structure that transmits an input vibration. The elastomeric member may engage the mass element and the second portion of the bracket and may suspend the mass element in spaced relation relative to the bracket. The elastomeric member may include a shaft portion and a barb portion. The shaft portion may engage the second portion of the bracket. The barb portion may engage the first aperture of the mass element. The elastomeric member may include properties allowing the mass element to move relative to the bracket in response to the input vibration at a frequency that reduces an amplitude of the input vibration.

In another form, the present disclosure provides a mass-damper assembly for a steering wheel. The mass-damper assembly may include a mass element, a bracket, and first and second elastomeric fasteners. The mass element may include a first engagement aperture and a second engagement aperture. The bracket may include a mounting arm for mounting the assembly to the steering wheel, a first support arm supporting the mass element, and a second support arm supporting the mass element. The first and second support arms may include first and second support apertures, respectively. The first elastomeric fastener may engage the first support aperture and the first engagement aperture. The second elastomeric fastener may engage the second support aperture and the second engagement aperture. The first and second elastomeric fasteners may maintain the mass element in a spaced apart relationship relative to the first and second support arms and allow the mass element to vibrate relative to the first and second support arms at a frequency that reduces an input vibration from the steering wheel.

In yet another form, the present disclosure provides a method that may include determining vibration characteristics of a steering wheel hub, tuning a plurality of elastomeric members to include predetermined structural properties based on the determined vibration characteristics of the steering wheel hub, securing a bracket to the steering wheel hub, suspending a mass from the bracket via the plurality of elastomeric members, and allowing the mass to vibrate relative to said bracket at a frequency that reduces vibration in the steering wheel hub.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
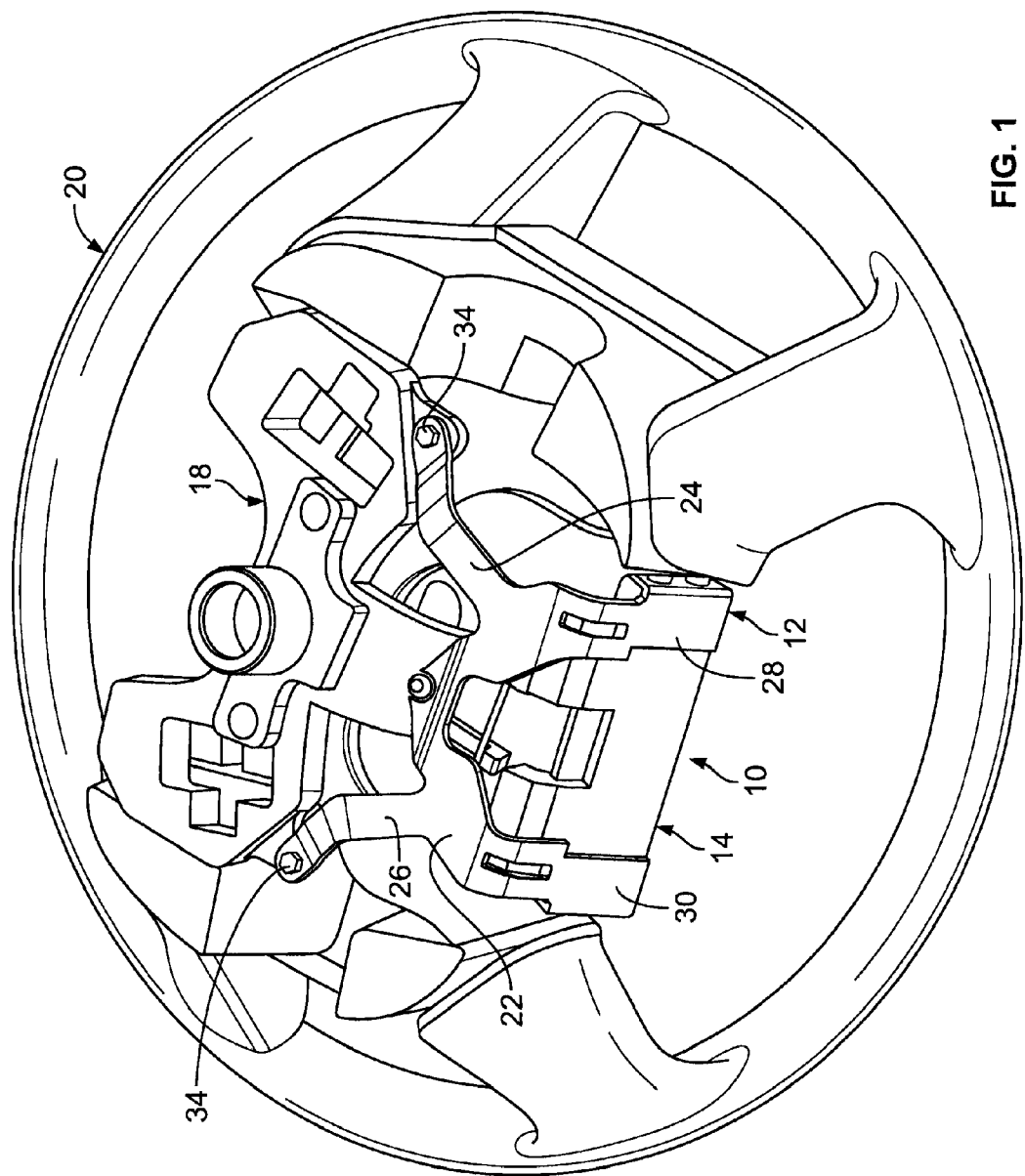
FIG. 1 is a perspective view of a steering wheel including a mass-damper assembly according to the principles of the present disclosure.
Figure 2:
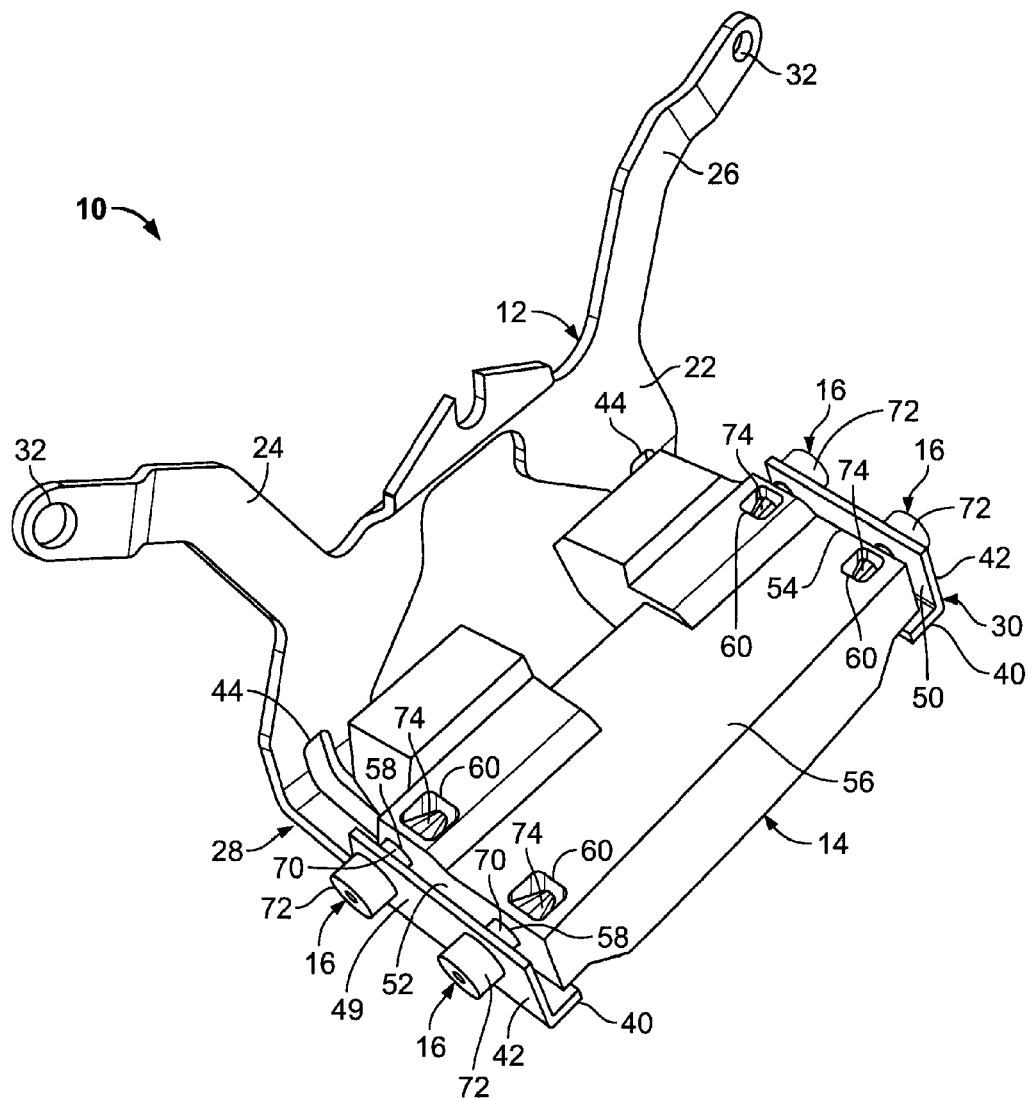
FIG. 2 is a perspective view of the mass-damper assembly of FIG. 1.
Figure 3:
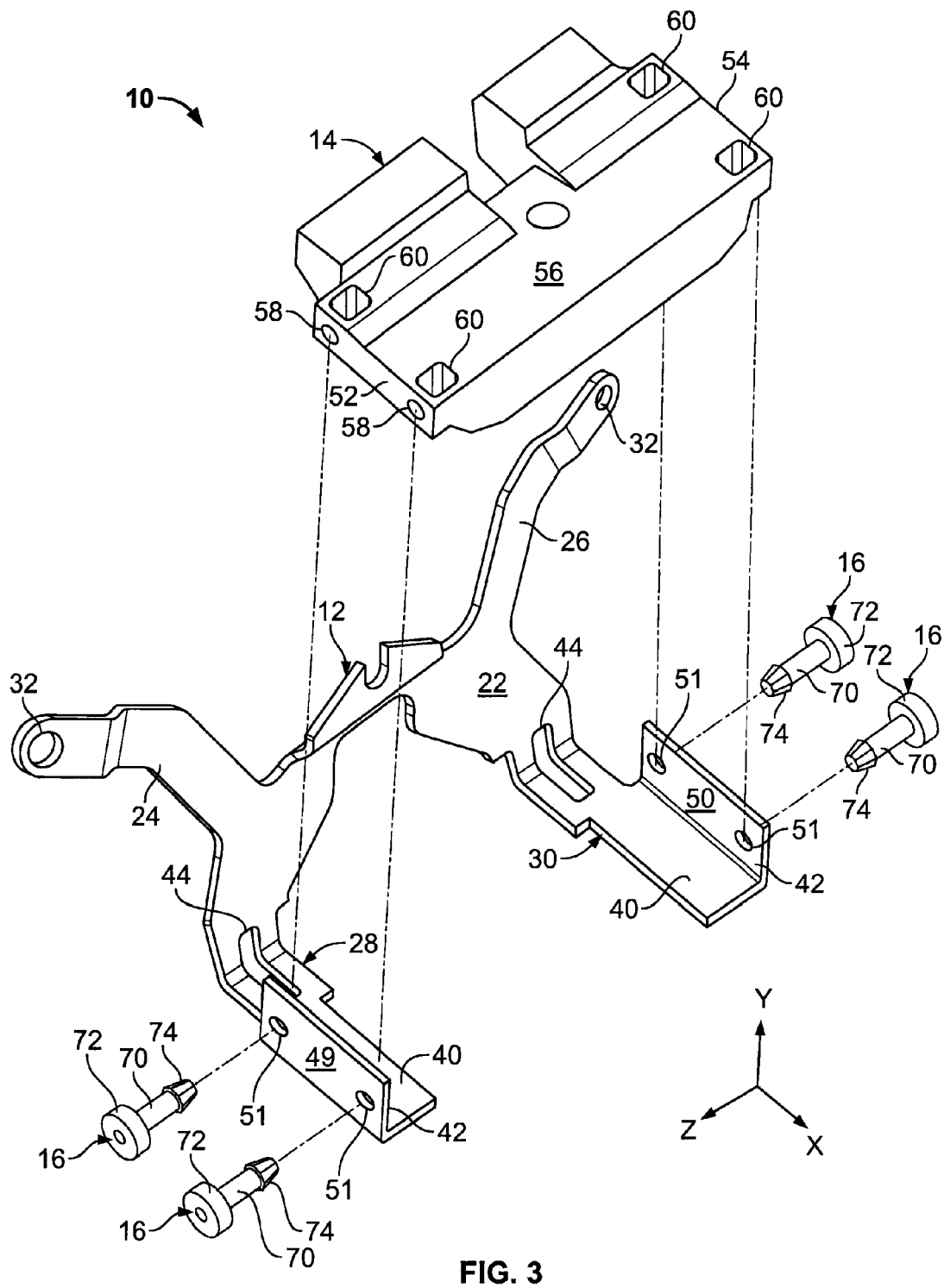
FIG. 3 is an exploded perspective view of the mass-damper assembly of FIG. 1.

The following description is merely exemplary in nature and is not intended to limit the present disclosure, its application, or uses. It should be understood that throughout the several views of the drawings, corresponding reference numerals indicate like or corresponding parts and features.

Throughout the description, example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-6, a mass-damper assembly 10 is provided and may include a bracket 12, a mass element 14, and a plurality of elastomeric fasteners 16. The mass-damper assembly 10 may be mounted to a central hub area 18 of a steering wheel assembly 20. As will be subsequently described, the plurality of elastomeric fasteners 16 may cooperate to suspend the mass element 14 relative to the bracket 12 and allow the mass element 14 to vibrate at a frequency and amplitude that reduces an input vibration that can be transmitted through the steering wheel assembly 20.

The bracket 12 may be formed from a relatively thin plate or sheet of metal, plastic or other material and may include a body portion 22 having first and second mounting arms 24, 26 and first and second support arms 28, 30 extending therefrom. Each of the first and second mounting arms 24, 26 may include a mounting aperture 32 extending therethrough. Fasteners 34 may engage the mounting apertures 32 and corresponding threaded apertures in the hub 18 to secure the bracket 12 to the steering wheel assembly 20.

The first and second support arms 28, 30 may extend from the body portion 22 in a first dimension X that is substantially perpendicular to body portion 22 and the first and second mounting arms 24, 26. Each of the first and second support arms 28, 30 may include a first portion 40 and a second portion 42. The first portion 40 may include a slot 44 extending at least partially across a length of the first portion 40. The second portion 42 may extend outwardly from the first portion 40 to form a generally L-shaped cross section. Each of the second portions 42 may include an outwardly facing surface 49, an inwardly facing surface 50, and one or more support apertures 51 extending therethrough.

The mass element 14 may be a generally solid block formed from a metallic or polymeric material, for example, or any other suitable material. The particular material, size and/or shape of the mass element 14 may be selected to yield a predetermined weight, as will be subsequently described. The mass element 14 may include a first end 52, a second end 54, and a first side 56. Each of the first and second ends 52, 54 may include one or more engagement apertures 58 extending inwardly therefrom in a second dimension Z. The engagement apertures 58 may be positioned relative to each other such that each of the plurality of engagement apertures 58 is aligned with a corresponding one of the support apertures 51 in the bracket 12. While the engagement apertures 58 are described above as being disposed in the first and second ends 52, 54, in other embodiments, the engagement apertures 58 may be disposed in any other suitable portion of the mass element 14.

The first side 56 may include a plurality of apertures 60 extending through at least a portion of a thickness of the mass element 14 in a third dimension Y. Each of the plurality of apertures 60 can correspond to and be in communication with one of the engagement apertures 58. While the plurality of apertures 60 are shown in the figures having a generally square shape, it will be appreciated that the plurality of apertures 60 could be round or otherwise suitably shaped.

Figure 4:
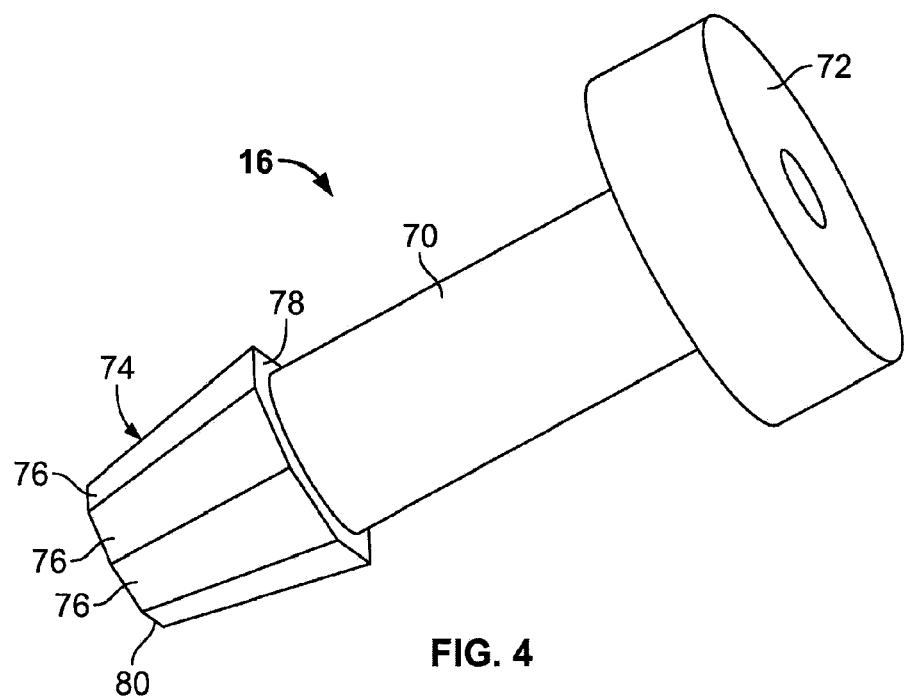
FIG. 4 is a perspective view of an elastomeric member of the mass-damper assembly according to the principles of the present disclosure.
Figure 5:
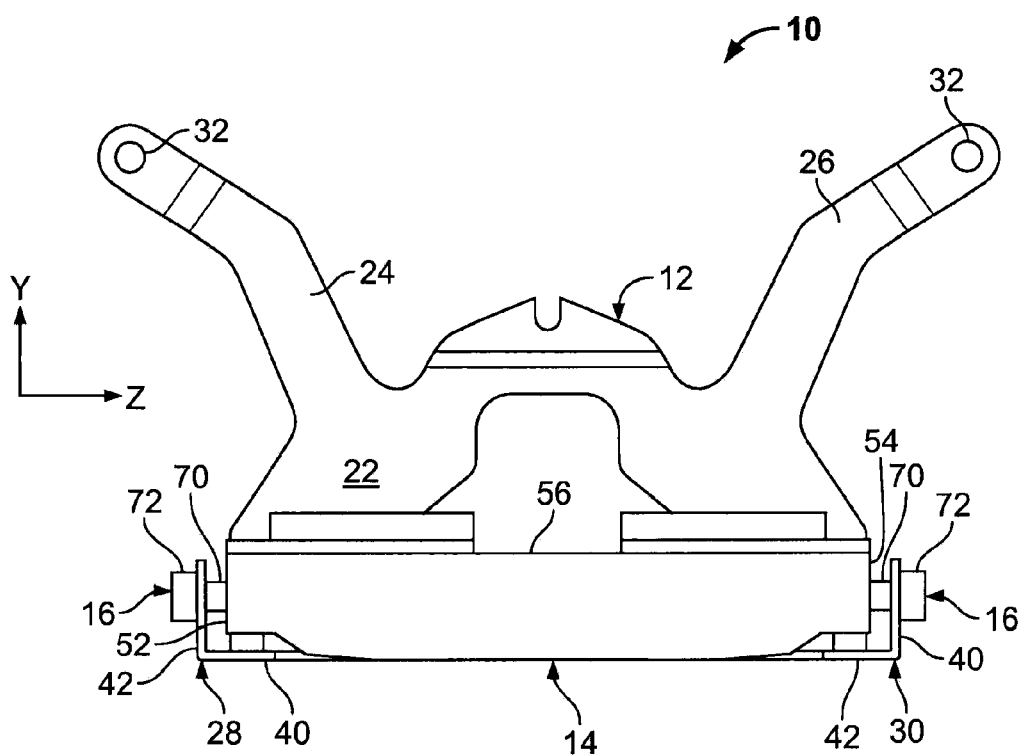
FIG. 5 is a front view of the mass-damper assembly.
Figure 6:
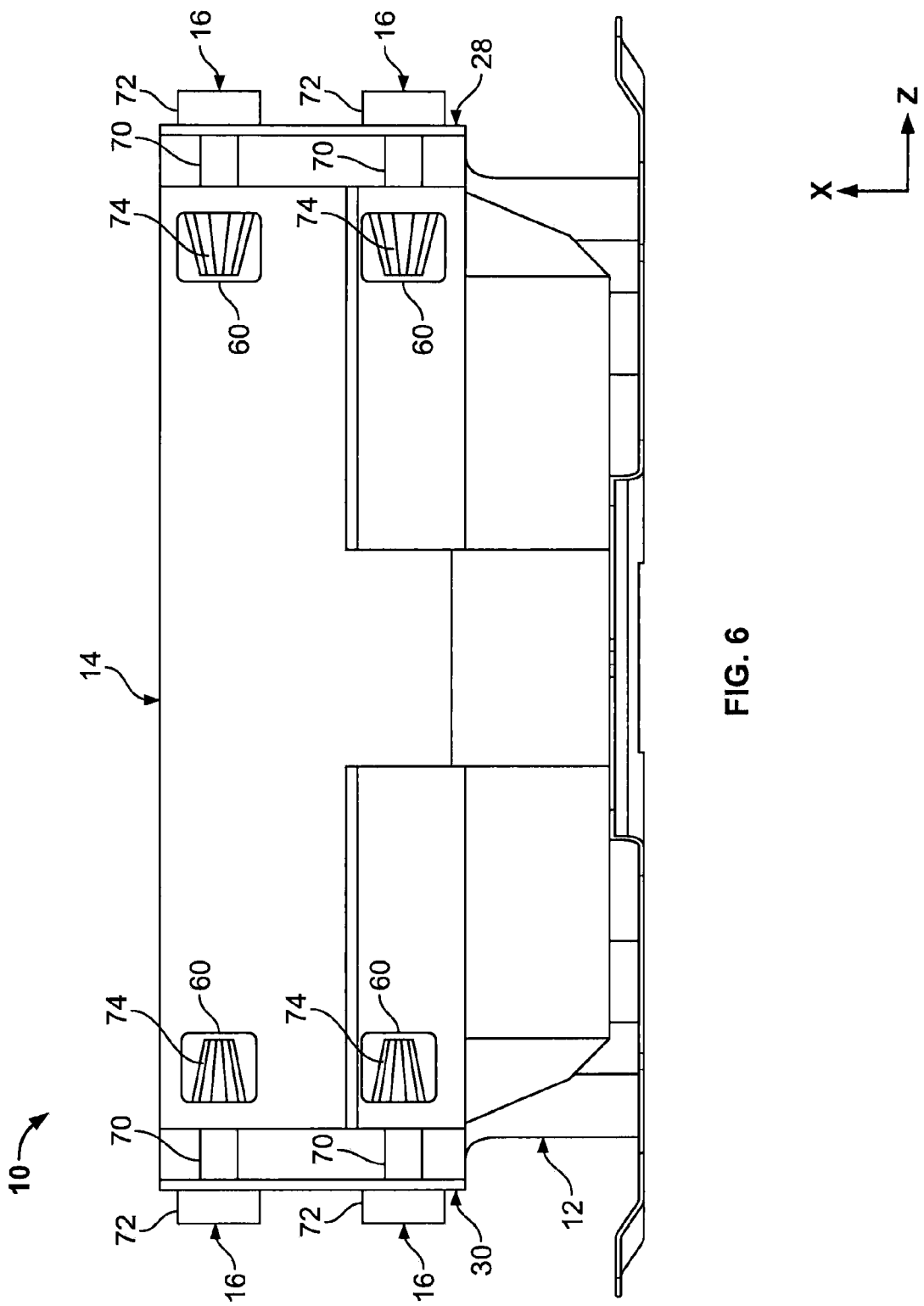
FIG. 6 is a top view of the mass-damper assembly.

The elastomeric fasteners 16 may be formed from a resiliently compressible and elastic material such as a natural rubber, silicone, or other elastomeric materials. Each of the elastomeric fasteners 16 may include a shaft portion 70, a head portion 72, and a barbed tip portion 74. The head portion 72 may be disposed at a first end of the shaft portion 70 and the tip portion 74 may be disposed at a second end of the shaft portion 70. The shaft portion 70 and the head portion 72 may be generally cylindrical members. As shown best in FIG. 4, the tip portion 74 may include a frusto-conical configuration with a first end 78 and a second end 80. The first end 78 may include a larger perimeter than a diameter of the shaft portion 70 and the second end 80 may include a smaller perimeter than the perimeter of the first end 78. Tip portion 74 may include a plurality of flat faces 76 that are angled relative to the shaft portion 70 and extend from the first end 78 to the second end 80, as shown in FIG. 4. It should be appreciated that tip portion 74 may not include flat faces 76, or may include fewer or more flat faces 76 than illustrated including, for example, two opposed flat faces 76. While the mass-damper assembly 10 is shown in the figures having two pairs of opposing elastomeric fasteners 16, in other embodiments, the mass-damper assembly 10 could have any number of elastomeric fasteners 16 arranged in any suitable configuration.

Each of the elastomeric fasteners 16 may be inserted through a corresponding one of the support apertures 51 and into a corresponding one of engagement apertures 58 such that the tip portion 74 is received in and engages a corresponding one of the apertures 60 and the head portion 72 abuts the outwardly facing surface 49 of the second portion 42 of the bracket 12. The first end 78 of the barbed tip portion 74 may include a width or diameter of the perimeter that is greater than a diameter of the engagement aperture 58 such that the tip portion 74 is retained in aperture 60 after being inserted through engagement aperture 58. In addition, the flat faces 76 may facilitate easier insertion of end 78 of tip portion 74 through the smaller diameter of engagement aperture 58.

The elastomeric fasteners 16 engaging the apertures 60 proximate the first and second ends 52, 54 of the mass element 14, respectively, may exert equal and opposite retaining forces on the mass element 14, thereby retaining the mass element 14 in a suspended condition relative to the bracket 12 such that the mass element 14 is spaced apart from the inwardly facing surfaces 50 of the second portions 42 and the rest of the bracket 12. The resiliently deflectable material and structure of the elastomeric fasteners 16 may allow the mass element 14 to vibrate or move relative to the bracket 12 in the first, second and/or third dimensions X, Z, Y and without contacting bracket 12.

With reference to FIGS. 1-6, operation of the mass-damper assembly 10 and a method of attenuating vibration will be described in detail. As described above, the mass-damper assembly 10 may be mounted to the hub area 18 of the steering wheel assembly 20 and may reduce or attenuate vibrations in the steering wheel assembly 20. The material and structure of the elastomeric fasteners 16 may be designed or tuned to allow the mass element 14 to vibrate at a predetermined frequency and amplitude in response to vibrations that may propagate through the steering wheel assembly 20 and into the bracket 12. Such vibration of the mass element 14 relative to the bracket 12 may cancel or reduce these vibrations in the steering wheel assembly 20.

The mass-damper assembly 10 for a particular steering wheel assembly 20 of a particular vehicle may be tuned based on calculated or measured vibration characteristics of the particular steering wheel assembly 20 such as a natural frequency and a frequency and amplitude of vibration at the hub area 18 during operation of the vehicle. Vibration in the hub area 18 having a first frequency can be cancelled or reduced by introducing vibration of the mass element 14 at a second frequency that is phase shifted relative to the first frequency. Therefore, based on the vibration characteristics of the steering wheel assembly 20, desired vibration characteristics of the mass element 14 relative to the bracket 12 can be determined that will cancel or reduce an amplitude of vibration in the steering wheel assembly 20.

To achieve the desired vibration characteristics of the mass element 14, the weight of the mass element 14 and/or material and/or geometric properties of the elastomeric fasteners 16 may be adjusted or tuned such that the mass element 14 will vibrate at the second frequency in response to vibration of the hub 18 of the steering wheel assembly 20 at the first frequency. Such tuning may include selecting a material having a desired modulus of elasticity, modulus of rigidity, and/or Young's modulus, for example, and/or adjusting relative dimensions and/or geometry of the elastomeric fasteners 16, for example, to facilitate vibration of a particular mass element 14 having a given weight.

Once the elastomeric fasteners 16 have been tuned for a given application, the mass-damper assembly 10 may be assembled and installed onto the hub area 18 of the steering wheel assembly 20. During operation of the vehicle, vibrations from operation of various vehicle systems (e.g., the engine, suspension and/or steering system) and/or encounters with bumps in the road or driving surface may propagate to the hub area 18 and the bracket 12. Such input vibrations (vibrating at a first frequency) may propagate through the first and second mounting arms 24, 26, the body portion 22, and the first and second support arms 28, 30. Because the mass element 14 is suspended relative to the bracket 12 via the elastomeric fasteners 16, the mass element 14 is allowed to vibrate at a second frequency in response to the input vibrations. As described above, the second frequency may be phase shifted relative to the first frequency, thereby cancelling or reducing the amplitude of the vibration in the steering wheel assembly 20.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A vibration attenuation apparatus comprising:
   a mass element including a first aperture and a second aperture, said second aperture in communication with said first aperture and extending substantially perpendicular to said first aperture;
   a bracket having first and second portions, said first portion adapted to be attached to a structure that transmits an input vibration; and
   an elastomeric member engaging said mass element and said second portion of said bracket and suspending said mass element in spaced relation relative to said bracket, said elastomeric member including a shaft portion and a barb portion, said shaft portion engaging said second portion of said bracket, said barb portion engaging said first aperture of said mass element, said elastomeric member having properties allowing said mass element to move relative to said bracket in response to said input vibration at a frequency that reduces an amplitude of said input vibration.

2. The vibration attenuation apparatus of claim 1, wherein said elastomeric member includes a head portion disposed at a first end of said shaft portion and said barb portion is disposed at a second end of said shaft portion.

3. The vibration attenuation apparatus of claim 1, wherein said barb portion includes a plurality of flat longitudinally extending surfaces.

4. The vibration attenuation apparatus of claim 3, wherein said barb portion includes a first end and a second end, said first end having a perimeter larger than a perimeter of said second end and a diameter of said shaft portion.

5. The vibration attenuation apparatus of claim 1, further comprising a plurality of elastomeric members.

6. The vibration attenuation apparatus of claim 5, wherein said second portion of said bracket includes first and second arms, and said plurality of elastomeric members suspend said mass element between said first and second arms.

7. The vibration attenuation apparatus of claim 1, wherein said elastomeric member is formed from one of natural rubber and silicone.

8. The vibration attenuation apparatus of claim 1, wherein said structure includes a steering wheel for a vehicle.

9. The vibration attenuation apparatus of claim 1, wherein material and geometric properties of said elastomeric member are tuned to facilitate vibration of said mass element at a frequency that reduces said amplitude of said input vibration.

10. A method comprising:
    determining vibration characteristics of a steering wheel hub;
    tuning a plurality of elastomeric members to include predetermined structural properties based on said determined vibration characteristics of said steering wheel hub;

securing a bracket to said steering wheel hub;

suspending a mass from said bracket via said plurality of elastomeric members; and allowing said mass to vibrate relative to said bracket at a frequency that reduces vibration in said steering wheel hub;

wherein suspending said mass from said bracket includes providing one of said plurality of elastomeric members at a first end of said mass and providing another of said plurality of elastomeric members at a second end of said mass such that longitudinal axes of at least two of said plurality of elastomeric members are substantially collinear.

11. The method of claim 10, wherein tuning said plurality of elastomeric members includes at least one of selecting a material and selecting a geometry.

12. The method of claim 10, further comprising forming said elastomeric members to include a head portion, a shaft portion, and a barbed tip portion having a larger width than said shaft portion.

13. The method of claim 12, further comprising forming a plurality of flat surfaces in said barbed tip portion.

14. The method of claim 10, wherein suspending said mass from said bracket includes inserting said elastomeric members through corresponding apertures in said bracket and said mass to retain said mass in spaced relation relative to said bracket.

15. The method of claim 10, further comprising providing said mass with first, second, third and fourth apertures, said first and second apertures in communication with and extending substantially perpendicular to said third and fourth apertures, respectively.

* * * * *